US 6,713,103 B2

United States Patent
Smith

(10) Patent No.: US 6,713,103 B2
(45) Date of Patent: Mar. 30, 2004

(54) PROTEIN FREE NON-TACKY EGG WASH SUBSTITUTE

(75) Inventor: Robert M. Smith, Ballwin, MO (US)

(73) Assignee: Par-Way Group, Inc., St. Clair, MO (US)

(*) Notice: Subject to any disclaimer, the term of this patent is extended or adjusted under 35 U.S.C. 154(b) by 123 days.

(21) Appl. No.: 09/838,780

(22) Filed: Apr. 20, 2001

(65) Prior Publication Data

US 2002/0187227 A1 Dec. 12, 2002

(51) Int. Cl.$^7$ .................. A21D 15/08; A23L 3/3454
(52) U.S. Cl. .................. 426/94; 426/302; 426/310; 426/653; 426/654; 426/658
(58) Field of Search .................. 426/94, 103, 302, 426/310, 653, 658

(56) References Cited

U.S. PATENT DOCUMENTS

| | | | |
|---|---|---|---|
| 4,645,674 A | * 2/1987 | Lang et al. .................. 426/94 |
| 4,762,721 A | * 8/1988 | Holscher et al. .................. 426/94 |
| 4,822,626 A | * 4/1989 | Spanier et al. .................. 426/94 |
| 5,128,161 A | 7/1992 | Smith .................. 426/326 |
| 5,225,222 A | * 7/1993 | Cha et al. .................. 426/89 |
| 5,756,140 A | * 5/1998 | Shoop et al. .................. 426/302 |
| 5,976,586 A | 11/1999 | Feller .................. 426/89 |

* cited by examiner

Primary Examiner—N. Bhat
(74) Attorney, Agent, or Firm—James A. Quinton

(57) ABSTRACT

A protein free glaze forming composition is provided which is storage stable at room temperature. The glaze forming composition includes water, a modified food starch, one or more antibacterial preservatives, a vegetable gum, an alginate and an edible food grade acid. The resulting composition is storage stable at room temperature. It is protein and milk free. It is also sugar free. In use, the surface glaze is sprayed on the bakery product either before or after baking to provide a high gloss shine. The surface glaze composition according to the invention is particularly useful on pies to provide a glaze that is crack resistant and on baked products with flaky crusts.

18 Claims, No Drawings

PROTEIN FREE NON-TACKY EGG WASH SUBSTITUTE

BACKGROUND OF THE INVENTION

1. Field of the Invention

The subject of the invention relates to an improved surface glaze composition for bakery goods and a method of producing a surface glaze for application on edible bakery products which can be used as a substitute for an egg wash.

2. Description of the Prior Art

Glazes have long been used in the production of bakery products such as bread, rolls or pastries. A common practice in the bakery industry has been to use an egg wash to provide to provide an attractive glaze. Egg washes have many disadvantages. There is a bacterial problem inherent in the handling and application of raw eggs to the surface of baked products. Moreover, egg washes must be brushed on by hand which is a labor intensive procedure. The search for a suitable egg wash substitute has been ongoing for sometime. However, such products have not replaced the egg wash. Many of the substitutes have stability problems and must be refrigerated or used shortly after they have been prepared.

Many of the egg wash substitutes proposed in the prior art include proteins, often milk based protein which can contribute to the stability problems. Such proteins are also undesirable since there are people allergic to such added proteins. See for example, U.S. Pat. No. 4,762,721 (Holscher).

Glazes containing maltodextrin have also been proposed. However, such products can become tacky in certain uses. Also such product can add unnecessary additional calories to the finished product. See U.S. Pat. No. 5,976,586 (Feller) and U.S. Pat. No. 5,128,161 (Smith).

SUMMARY OF THE INVENTION

The present invention is directed to an improved composition for producing a glaze for bakery products which is a suitable substitute for an egg wash. According to the invention, a protein free glaze forming composition is provided which is storage stable at room temperature. The glaze forming composition according to the invention includes water, a modified food starch, one or more antibacterial preservatives, a vegetable gum, an alginate and an edible food grade acid. The resulting composition is storage stable at room temperature. It is protein and milk free. It is also sugar free. In use, the surface glaze is sprayed on the bakery product either before or after baking to provide a high gloss shine. The surface glaze composition according to the invention is particularly useful on pies to provide a glaze that is crack resistant and on baked products with flaky crusts.

The product can be easily applied to the baked goods by spraying. When applied to the bakery goods, the composition dries to form a shiny glaze. The surface glaze forming composition provides a desirable egg wash substitute.

It is an object of the invention to provide a dairy free egg wash substitute for baked goods.

It is an object of the invention to provide a protein free egg wash substitute.

It is an object of the invention to provide an egg wash substitute that is storage stable at room temperature.

It is an object of the invention to provide an egg wash substitute that has a shelf life of one (1) year or longer at room temperature.

It is an object of the invention to provide an egg wash substitute that is sprayable as an aerosol.

It is an object of the invention to provide an egg wash substitute that can be hand pump sprayed.

It is an object of the invention to provide an egg wash substitute that can be used on baked goods with flaky crusts.

It is an object of the invention to provide an egg wash substitute that provides a shine on pies without cracking the crust.

It is an object of the invention to provide an egg wash substitute that can be used either before or after freezing of the bakery product.

It is an object of the invention to provide an egg wash substitute that can be used either before or after baking.

It is an object of the invention to provide an egg wash substitute that does not become tacky in an unperforated plastic bag.

It is an object of the invention to provide an egg wash substitute to provide a low calorie egg wash substitute.

Other and further objects will be apparent from the following detail description of the invention.

The preferred embodiment of the present invention is illustrated in the drawings and examples. However, it should be expressly understood that the present invention should not be limited solely to the illustrative embodiments.

DETAILED DESCRIPTION OF THE INVENTION

The present invention is directed to an improved composition for producing a surface glaze for bakery products which is a suitable substitute for an egg wash. Desirably, the bakery products are rolls, flaky pastries, croissants, pies, preferably fruit pies.

According to the invention, a protein free glaze forming composition is provided which is storage stable at room temperature. The glaze forming composition according to the invention includes water, a modified food starch, one or more antibacterial preservatives, a vegetable gum, an alginate, and an edible food grade acid.

The resulting composition has a long shelf life at room temperature (77° F.). It can be stored at room temperature for one (1) year or longer without refrigeration or a sealed container. It is protein free and sugar free. The product is low in calories, desirably 2.5 calories per gram or less desirable, about 2.3 calories per gram.

In use, the surface glaze according to the invention can be sprayed on the bakery product either before or after baking. It provides a high gloss shine. It is desirably used on baked products with flaky crusts. The composition according to the invention is particularly useful on pies to provide a glaze that is crack resistant. Treated baked products can be packaged in an unperforated plastic bag without becoming tacky.

The product can be easily applied to the baked goods by spraying. It can be packaged as an aerosol or be used in a handpump sprayer. When applied to the bakery goods, the composition dries to form a shiny glaze. The glaze forming product provides a desirable egg wash substitute. The product can be applied to the bakery goods either before or after the product is frozen. It can be applied before or after bakery products are baked.

According to the invention, the modified food starch can be supplied from various suitable sources such as corn, potato, wheat, rice, or the like, preferably wheat modified food starch. The vegetable gums for example guar gum, arabia gum, tragacanth gum, preferably xanthan gum are used. The alginate is preferably propylene gylyol alginate. Desirably, the edible food grade acid is chosen from the food grade acids available for example citric, acetic malic, phosphoric, preferably citric acid. Preferably, according to the invention, the glaze forming composition has a pH of 4.5 or lower.

Preservatives are included in the composition to retard bacterial growth. Desirably, sodium benzoate and potassium sorbate are used. Desirably, antifoaming agents are also included in the composition preferably a non silicone antifoaming agent (type) Calgene Q1130 supplied by Calgene Corp., Chicago, Ill.

Preferably, the glaze forming composition according to the invention includes 50% by weight of water or more, preferably 70% to 90% desirably, about 85%. A modified food starch preferably a modified wheat starch is included in an amount of 10% to 25% by weight, preferably about 12% to 16% by weight desirably about 14%. A vegetable gum, preferably xanthan gum is included in an amount of about 0.05% to 0.2%, preferably about 0.07% to 0.10% by weight. An alginate, preferably propylene glycol alginate in an amount of about 0.05% to 0.2% preferably about 0.08% to 0.10% by weight is included.

Preservatives preferably sodium benzoate in an amount of 0.1% to 0.5% by weight preferably about 0.10% are included. A food grade acid desirably citric, acetic, malic, or phosphoric acid, preferably citric acid is included in an amount of 0.2% and 1.0% by weight.

An antifoaming agent, preferably a non silicone antifoaming agent is added in an effective amount. For example, non silicone antifoaming agent Calgene Q-1130 supplied by Calgene Corp., Chicago, Ill. can be used.

The glaze composition according to the invention is prepared by mixing the components in a tank with a normal lightning mixer. There is no need to use a high shear mixer as required by prior art composition.

The resulting composition is useful in imparting a high glaze to bakery products, preferably, rolls, flaky pastries, croissants, pies, preferably fruit pies. According to the invention, a crack resistant glaze is imparted to fruit pies. The glaze can be applied either before or after baking or before or after freezing.

The composition is low in calories, 2.5 calories per gram or less. It has a low pH of 4.5 or less. The composition has a long storage life of one (1) year or more at room temperature. It is protein, dairy and sugar free.

EXAMPLE 1

An eggwash substitute according to the invention was prepared having the following composition:

|  | Weight % |
| --- | --- |
| Water | 85 |
| Modified Food Starch (wheat starch) | 14 |
| Citric Acid | 0.4 |
| Potassium Sorbate | .35 |
| Sodium Benzoate | 0.1 |
| Xanthan Gum | 0.1 |
| Propylene Glycol Alginate | 0.1 |

EXAMPLE 2

The composition of Example 1 was compared to a prior art egg wash composition marketed by Lawrence Foods as Spray-On-Shine under U.S. Pat. No. 5,976,586 having a stated composition of:

Water
Corn Sweeteners
Modified Starch
Maltodextrin
Vegetable Gums
Citric Acid
Potassium Sorbate
Sodium Benzoate A dozen European Country Classic hard rolls were baked at 400° F. for eight minutes. After baking, six rolls were sprayed with the composition of Example 1 and six rolls were sprayed with Spray-On-Shine of Lawrence Foods. The same amount of product was sprayed on each roll. The rolls sprayed with the Example 1 composition had a very high glossy, great shine. The Spray-On-Shine had very little shine. In addition, an unsightly white film was left on the rolls.

EXAMPLE 3

Two frozen Pillsbury foodservice pies were baked at 375° for forty-two minutes in a convection oven. Before baking one frozen pie was sprayed with composition of Example 1, and one frozen pie was sprayed with Spray-On-Shine. The same amount of product was sprayed on each pie. The pies were removed from the oven after baking and observed for shine. The Spray-On-Shine pie had no shine at all. The pie baked with the composition of Example 1 had a very glossy shine and even browning of the piecrust.

EXAMPLE 4

Freeze-thaw studies were performed on the composition of Example 1 and Spray-On-Shine. Eighteen (18) ounces of each product was put in the freezer overnight. They were both frozen solid when removed from the freezer the next day. The Example 1 composition was heated in the microwave on full power for seven minutes. The formula regained its original appearance and sprayed normally. The Example 1 composition also performed normally when sprayed on pies and rolls and provided a glossy shine.

Lawrence Foods' Spray-On-Shine was tested identically to Example 1 composition. After microwaving the Spray-On-Shine it separated and produced a precipitate. The product clogged the sprayer and would not spray properly. The original appearance and properties of the formula could not be obtained after freezing.

EXAMPLE 5

A composition made in accordance with U.S. Pat. No. 5,128,161 was prepared having the following composition:

| Deionized Water | 86.80% |
| --- | --- |
| Maltodextrin | 12.00% |
| Polyethylene Glycol | 0.90% |
| Propylene Glycol Alginate | 0.10% |
| Sorbic Acid | 0.10% |
| Potassium Sorbate | 0.10% |
|  | 100.00% |

EXAMPLE 6

The composition of Example 1 was compared to the composition of Example 5 (U.S. Pat. No. 5,128,161) as follows:

Freshly baked rolls were sprayed with the composition of Example 1 and with the composition of Example 5. The rolls were placed in unvented bags overnight. The rolls sprayed with the composition of Example 1 were easily removed from the bags. The rolls sprayed with the composition of Example 5 were tacky and struck to the bags.

EXAMPLE 7

The composition of Example 5 was sprayed on a frozen pie and baked as described in Example 3. The resulting pie was dull and did not shine.

While this invention has been particularly shown and described with references to preferred embodiments and Examples thereof, it will be understood by those skilled in the art that various changes in form or detail may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A surface glaze forming composition for use on bakery products comprising;
   a) a modified food starch in an amount of about 10% to 25% by weight;
   b) water in an amount of about 70% to 90% by weight
   c) a vegetable gum in an amount of about 0.05% to 0.2% by weight;
   d) an alginate in an amount of about 0.05% to 0.2% by weight;
   e) a preservative;
   f) a food grade acid;
   g) said composition being essentially sugar and maltodextrin free.

2. A surface glaze forming composition according to claim 1 wherein said preservative is sodium benzoate, potassium sorbate, or both.

3. A surface glaze forming composition according to claim 2 wherein said preservative is sodium benzoate in an amount of about 0.1% to 0.5% by weight and potassium sorbate in an amount of about 0.1% to 0.5% by weight.

4. A surface glaze forming composition according to claim 1 further comprising said composition having a pH of about 4.5 or lower.

5. A surface glaze forming composition according to claim 2 wherein said modified food starch is wheat starch.

6. A surface glaze forming composition according to claim 5 wherein said alginate is propylene glycol alginate.

7. A surface glaze forming composition according to claim 5 wherein said wheat starch is in an amount of about of 12% to 16% by weight.

8. A surface glaze forming composition according to claim 6 wherein said vegetable gum is xanthan gum.

9. A surface glaze forming composition according to claim 8 wherein said xanthan gum is about 0.07% to 0.1% by weight.

10. A surface glaze forming composition according to claim 9 wherein said food grade acid is citric, acetic, malic or phosphoric acid.

11. A surface glaze forming composition according to claim 10 wherein said food grade acid is citric acid.

12. A surface glaze forming composition according to claim 8 further comprising an antifoaming agent in an amount of 0.1% to 0.7%.

13. A surface glaze forming composition according to claim 1 or 11 wherein said composition is 2.5 cal/gm or less.

14. A surface glaze forming composition according to claim 8 wherein said bakery products are pies, croissants and flaky pastries.

15. A surface glaze forming composition according to claim 8 wherein said bakery goods are pies.

16. A method of forming a high gloss glaze on a bakery product that is crack resistant comprising spraying a coating of the composition according to claim 1 or 11 on a bakery product.

17. The method of forming a high gloss glaze according to claim 16 wherein said bakery product is a pie.

18. A glaze forming composition for bakery products comprising;
   a) a modified food starch;
   b) water;
   c) a vegetable gum;
   d) an alginate;
   e) a preservative;
   f) a food grade acid;
   g) said composition being essentially sugar and maltodextrin free.

* * * * *